United States Patent
Ang et al.

(10) Patent No.: US 11,985,594 B2
(45) Date of Patent: May 14, 2024

(54) WAKE-UP SIGNAL AND BANDWIDTH PART MANAGEMENT

(71) Applicant: QUALCOMM Incorporated, San Diego, CA (US)

(72) Inventors: Peter Pui Lok Ang, San Diego, CA (US); Raghu Narayan Challa, San Diego, CA (US); Aamod Khandekar, San Diego, CA (US); Alexei Yurievitch Gorokhov, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 17/331,274

(22) Filed: May 26, 2021

(65) Prior Publication Data

US 2021/0377861 A1 Dec. 2, 2021

Related U.S. Application Data

(60) Provisional application No. 63/032,294, filed on May 29, 2020.

(51) Int. Cl.
| | |
|---|---|
| *H04W 72/00* | (2023.01) |
| *H04W 8/24* | (2009.01) |
| *H04W 52/02* | (2009.01) |
| *H04W 72/0446* | (2023.01) |
| *H04W 72/0453* | (2023.01) |

(Continued)

(52) U.S. Cl.
CPC ......... *H04W 52/0229* (2013.01); *H04W 8/24* (2013.01); *H04W 72/0446* (2013.01); *H04W 72/0453* (2013.01); *H04W 72/23* (2023.01); *H04W 76/28* (2018.02)

(58) Field of Classification Search
None
See application file for complete search history.

(56) References Cited

U.S. PATENT DOCUMENTS

2020/0314748 A1* 10/2020 Kim .................. H04W 52/0229
2021/0400580 A1* 12/2021 Maleki .............. H04W 52/0216

(Continued)

OTHER PUBLICATIONS

International Search Report and Written Opinion—PCT/US2021/034493—ISA/EPO—dated Sep. 15, 2021.

(Continued)

*Primary Examiner* — Abdelillah Elmejjarmi
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a configuration of a minimum slot offset based at least in part on a determination of a minimum wake-up signal (WUS) gap capability associated with the UE, wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion scheduled by the PDCCH; and monitor the PDCCH occasion for a downlink grant based at least in part on the configuration. Numerous other aspects are provided.

30 Claims, 10 Drawing Sheets

(51) Int. Cl.
　　　*H04W 72/23*　　　(2023.01)
　　　*H04W 76/28*　　　(2018.01)

(56) References Cited

U.S. PATENT DOCUMENTS

2022/0338119 A1* 10/2022 Seo .................... H04W 72/044
2023/0056906 A1* 2/2023 Yang .................... H04W 76/28
2023/0064881 A1* 3/2023 Liu .................... H04W 72/044

OTHER PUBLICATIONS

Oppo: "Remaining Issues for Power Saving Signal", 3GPP TSG RAN WG1 #101, 3GPP Draft, R1-2004101, 3rd Generation Partnership Project (3GPP), Mobile Competence Centre, 650, Route Des Lucioles, F-06921 Sophia-Antipolis Cedex, France, vol. RAN WG1, No. e-Meeting, May 25, 2020-Jun. 5, 2020, 4 Pages, May 16, 2020 (May 16, 2020), XP051885860, Retrieved from the Internet: URL: https://ftp.3gpp.org/tsg_ran/WG1_RL1/TSGR1_101-e/Docs/R1-2004101.zip R1-2004101.doc [retrieved on May 16, 2020] paragraph 2, figures 1 and 2.

Qualcomm Incorporated: "Triggering Adaptation of UE Power Consumption Characteristics", 3GPP TSG-RAN WG1 Meeting #95, 3GPP Draft, R1-1813448 Triggering Mechanism for Adaptation, 3rd Generation Partnership Project (3GPP), Mobile Competence Centre, 650, Route Des Lucioles, F-06921 Sophia-Antipolis Cedex, France, vol. RAN WG1, No. Spokane, Washington, USA, Nov. 12, 2018-Nov. 16, 2018, 17 Pages, Nov. 11, 2018 (Nov. 11, 2018), XP051555487, Retrieved from the Internet: URL: http://www.3gpp.org/ftp/Meetings%5F3GPP%5FSYNC/RAN1/Docs/R1%2D1813448%2Ezip [retrieved on Nov. 11, 2018] paragraph 3.1.1.1, paragraph 3.1.1.2, figure 2.

Sony: "Remaining Issues on PDCCH-based WUS", 3GPP TSG RAN WG1 #100bis, 3GPP Draft, R1-2001819, 3rd Generation Partnership Project (3GPP), Mobile Competence Centre, 650, Route Des Lucioles, F-06921 Sophia-Antipolis Cedex, France, vol. RAN WG1, No. e-meeting, Apr. 20, 2020-Apr. 30, 2020, 7 Pages, Apr. 9, 2020 (Apr. 9, 2020), XP051870442, Retrieved from the Internet: URL: https://ftp.3gpp.org/tsg_ran/WG1_RL1/TSGR1_100b_e/Docs/R1-2001819.zip R1-2001819.docx [retrieved on Apr. 9, 2020] paragraph 2.2, figure 2.

Spreadtrum Communications: "Discussion on PDCCH-based Power Saving Channel", 3GPP TSG RAN WG1 Meeting #98, 3GPP Draft, R1-1908965_Discussion on PDCCH-based Power Saving Channel, 3rd Generation Partnership Project (3GPP), Mobile Competence Centre, 650, Route Des Lucioles, F-06921 Sophia-Antipolis Cedex, vol. RAN WG1, No. Prague, Czech Rep, Aug. 26, 2019-Aug. 30, 2019, 13 Pages, Aug. 17, 2019 (Aug. 17, 2019), XP051765571, Retrieved from the Internet: URL: http://www.3gpp.org/ftp/tsg_ran/WG1_RL1/TSGR1_98/Docs/R1-1908965.zip [retrieved on Aug. 17, 2019] paragraph 2.2, paragraph 2.3, paragraph 3.3, paragraph A.2.2, paragraph A.3, figure 1.

ZTE: "Discussion on Potential Techniques for UE Power Saving", 3GPP Draft, 3GPP TSG RAN WG1 Meeting #96, R1-1902031 Discussion on Potential Techniques for UE Power Saving-Final, 3rd Generation Partnership Project (3GPP), Mobile Competence Centre, 650, Route Des Lucioles, F-06921 Sophia-Antipolis, vol. RAN WG1, No. Athens, Greece, Feb. 25, 2019-Mar. 1, 2019, Feb. 16, 2019 (Feb. 16, 2019), XP051599727, pp. 1-22, Retrieved from the Internet: URL: http://www.3gpp.org/ftp/tsg%5Fran/WG1%5FRL1/TSGR1%5F96/Docs/R1%2D1902031%2Ezip, [retrieved on Feb. 16, 2019], p. 8, paragraph 3.5—p. 9, Paragraph 3.5, p. 15, paragraph 4.3.2—p. 16, paragraph 4.3.2, figures 8, 13, paragraph 1, paragraph 3.

* cited by examiner

WAKE-UP SIGNAL AND BANDWIDTH PART MANAGEMENT

CROSS-REFERENCE TO RELATED APPLICATION

This Patent Application claims priority to U.S. Provisional Patent Application No. 63/032,294, filed on May 29, 2020, entitled "WAKE-UP SIGNAL AND BANDWIDTH PART MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for management of wake-up signals and bandwidth parts.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, a configuration of a minimum slot offset based at least in part on a determination of a minimum wake-up signal (WUS) gap capability associated with the UE, wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion scheduled by the PDCCH; and monitoring the PDCCH occasion for a downlink grant based at least in part on the configuration.

In some aspects, a method of wireless communication, performed by a base station, may include transmitting, to a UE, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a PDCCH occasion and a PDSCH occasion scheduled by the PDCCH; and transmitting, to the UE, data carried in the PDSCH occasion based at least in part on the configuration.

In some aspects, a UE for wireless communication may include a memory and one or more processors coupled to the memory. The memory and the one or more processors may be configured to receive, from a base station, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a PDCCH occasion and a PDSCH occasion scheduled by the PDCCH; and monitor the PDCCH occasion for a downlink grant based at least in part on the configuration.

In some aspects, a base station for wireless communication may include a memory and one or more processors coupled to the memory. The memory and the one or more processors may be configured to transmit, to a UE, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a PDCCH occasion and a PDSCH occasion scheduled by the PDCCH; and transmit, to the UE, data carried in the PDSCH occasion based at least in part on the configuration.

In some aspects, a non-transitory computer-readable medium may store one or more instructions for wireless communication. The one or more instructions, when executed by one or more processors of a UE, may cause the one or more processors to receive, from a base station, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a PDCCH occasion and a PDSCH occasion scheduled by the PDCCH; and monitor the PDCCH occasion for a downlink grant based at least in part on the configuration.

In some aspects, a non-transitory computer-readable medium may store one or more instructions for wireless communication. The one or more instructions, when executed by one or more processors of a base station, may cause the one or more processors to transmit, to a UE, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a PDCCH occasion and a PDSCH occasion scheduled by the PDCCH; and transmit, to the UE, data carried in the PDSCH occasion based at least in part on the configuration.

In some aspects, an apparatus for wireless communication may include means for receiving, from a base station, a configuration of a minimum slot offset based at least in part on a determination of a minimum WUS gap capability associated with the apparatus, wherein the minimum WUS gap capability corresponds to a capability of the apparatus to support a WUS gap having a minimum gap size, wherein the minimum slot offset indicates a minimum time period between a PDCCH occasion and a PDSCH occasion scheduled by the PDCCH; and means for monitoring the PDCCH occasion for a downlink grant based at least in part on the configuration.

In some aspects, an apparatus for wireless communication may include means for transmitting, to a UE, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a PDCCH occasion and a PDSCH occasion scheduled by the PDCCH; and means for transmitting, to the UE, data carried in the PDSCH occasion based at least in part on the configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
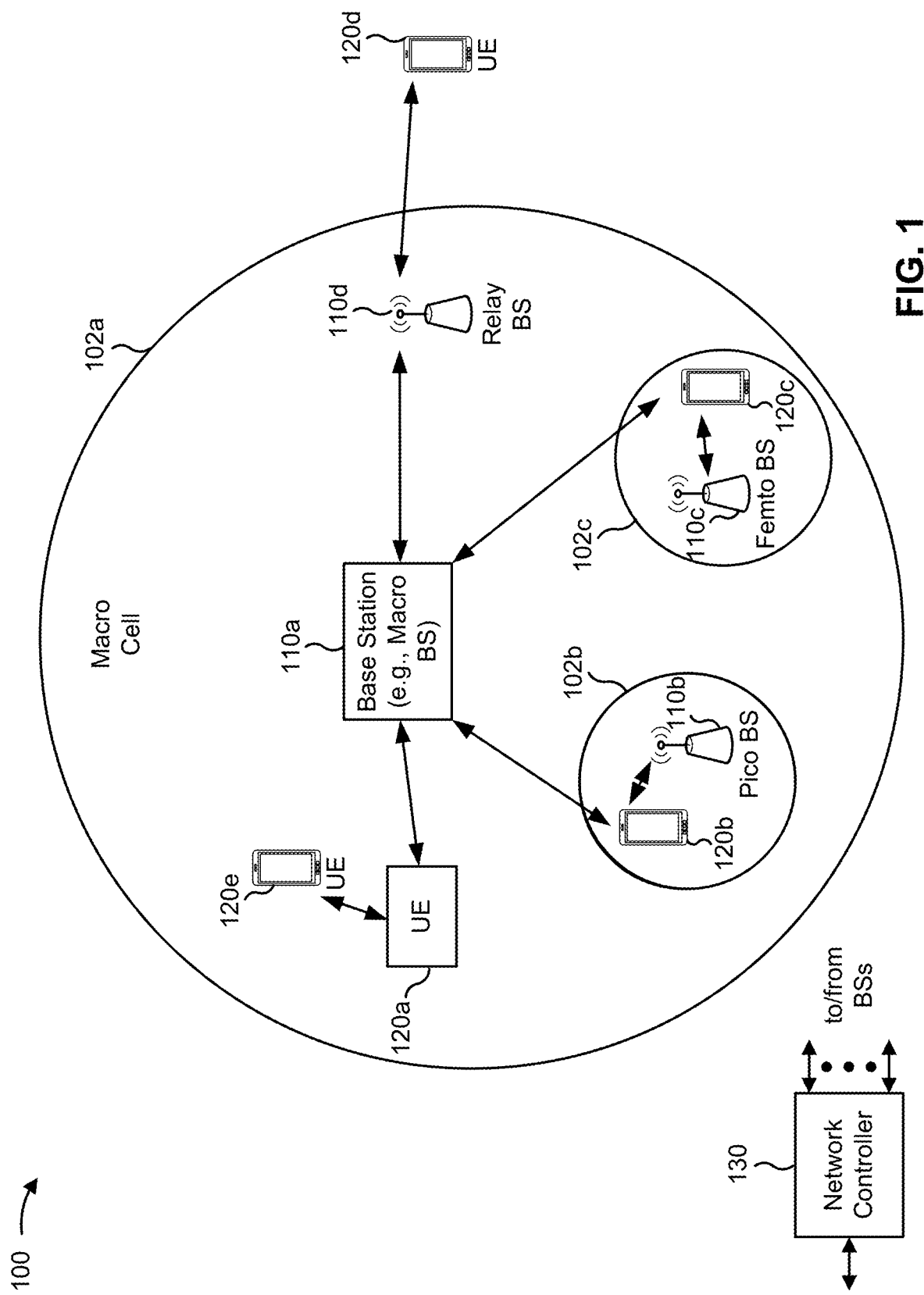
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
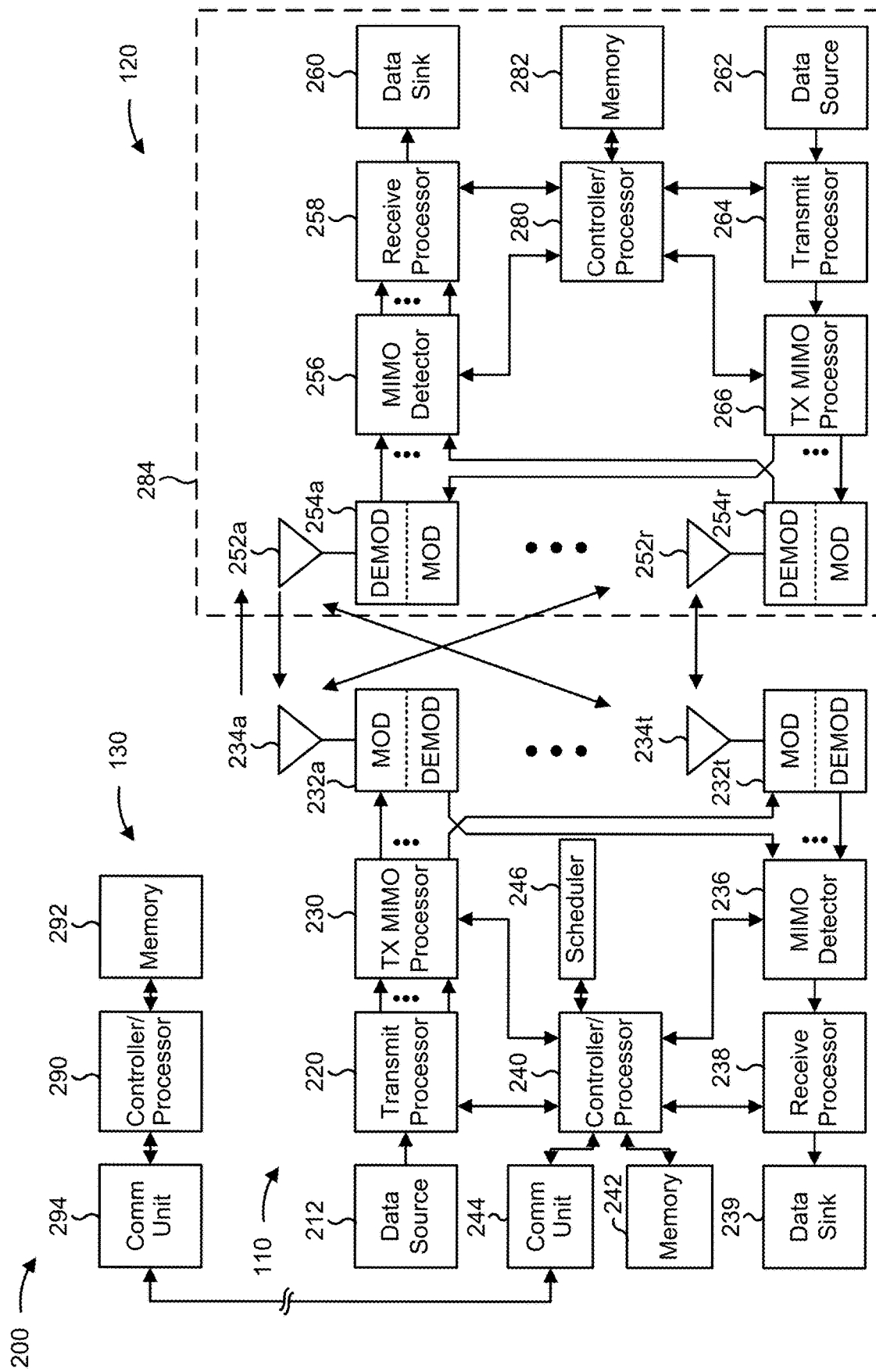
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to 5-10).

Controller/processor 240 of base station 110, controller/processor 280 of UE 120, and/or any other component(s) of FIG. 2 may perform one or more techniques associated with management of wake-up signals (WUSs) and bandwidth parts (BWPs), as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for receiving, from a base station, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion scheduled by the PDCCH, means for monitoring the PDCCH occasion for a downlink grant based at least in part on the configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a configuration of a minimum slot offset based at least in part on a determination of a minimum WUS gap capability associated with the UE, wherein the minimum WUS gap capability corresponds to a capability of the UE to support a WUS gap having a minimum gap size, wherein the minimum slot offset indicates a minimum time period between a PDCCH occasion and a PDSCH occasion scheduled by the PDCCH, means for transmitting, to the UE, data carried in the PDSCH occasion based at least in part on the configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
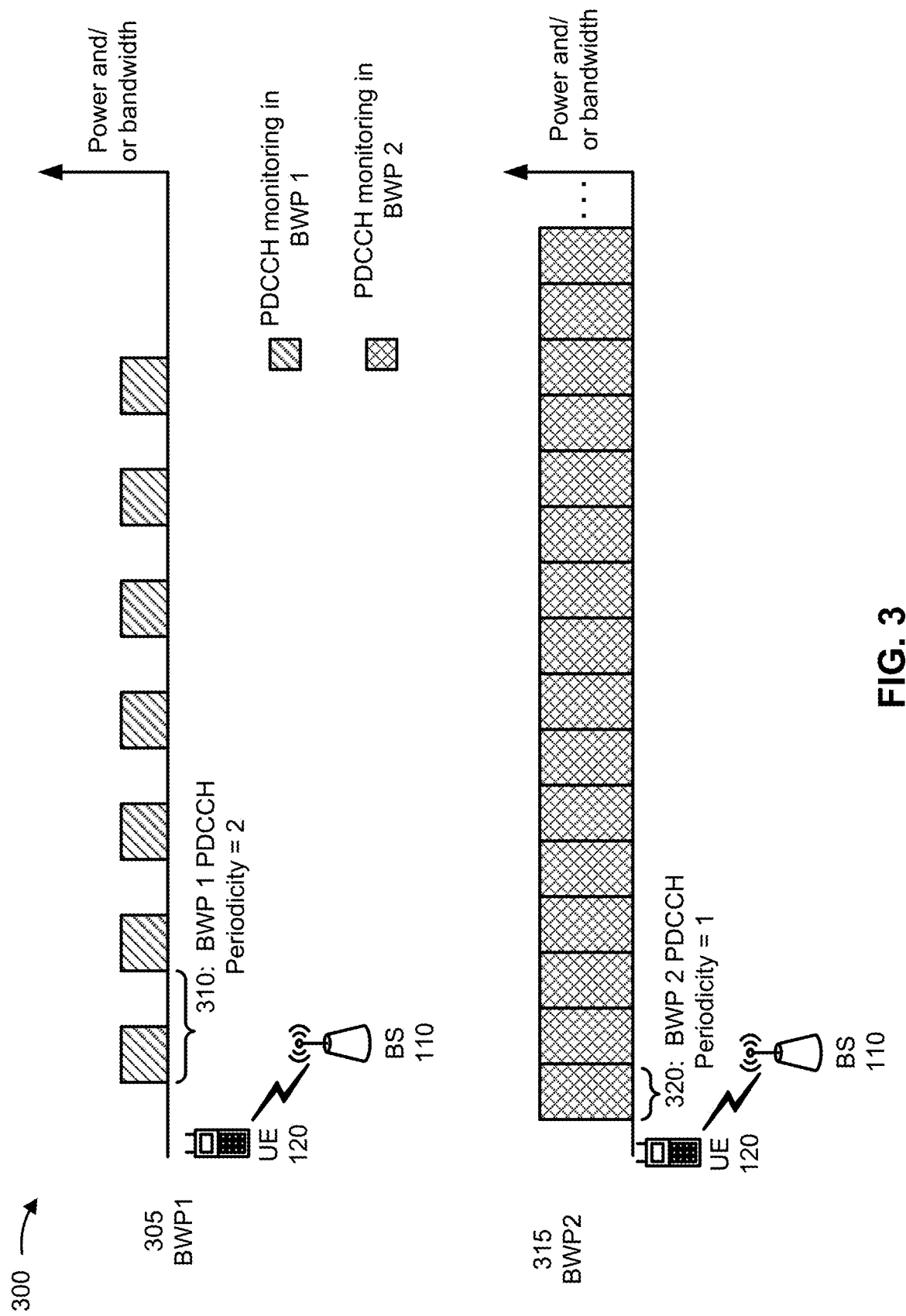
FIG. 3 is a diagram illustrating an example of bandwidth part (BWP) management, in accordance with the present disclosure.

FIG. 3 is a diagram illustrating an example 300 relating to bandwidth part (BWP) management, in accordance with the present disclosure. As shown in FIG. 3, example 300 includes a UE 120 in communication with a BS 110 using a BWP of a plurality of BWPs.

As further shown in FIG. 3, and by reference number 305, in a first scenario, UE 120 may be in communication with BS 110 using a first BWP (BWP1). In some aspects, the first BWP may be associated with a less than a threshold bandwidth and with a greater than a threshold timing parameter. The timing parameter may comprise a minimum slot offset, k0, and may identify a minimum size of a gap period between a downlink control information (DCI) message carrying a downlink grant and the corresponding PDSCH transmission. In some aspects, the first BWP may be used with a larger non-zero minimum slot offset (e.g., larger than a threshold). In some aspects, the first BWP may be associated with a reduced maximum number of multiple-input and multiple-output (MIMO) layers. As shown by reference number 310, the first BWP may be associated with a particular monitoring periodicity for a downlink control channel (e.g., Periodicity=2). For example, the first BWP may be associated with monitoring for a DCI message in alternating slots of the first BWP.

In some aspects, UE 120 may use the first BWP when operating in a DRX mode. For example, UE 120 may use the first BWP for relatively low amounts (e.g., less than a threshold amount) of data activity, and when a relatively high latency (e.g., greater than a threshold latency) may be acceptable. In some aspects, UE 120 may select, as the first BWP to operate in after a DRX mode (e.g., a sleep mode), a default bandwidth part for a secondary cell and/or a primary cell, a BWP active during a previous DRX cycle (e.g., a most recently active BWP), a configured BWP (e.g., a signaled bandwidth part for the primary cell, the secondary cell, and/or the like), a BWP active at a start of an ON duration, and/or the like.

As further shown in FIG. 3, and by reference number 315, in a second scenario, UE 120 may communicate with BS 110 using a second BWP (BWP2). In some aspects, the second BWP may be associated with a not less than the threshold bandwidth (e.g., greater than or equal to the threshold bandwidth) and a not greater than the threshold timing parameter (e.g., less than or equal to the threshold timing parameter). In some aspects, the second BWP may be associated with a smaller minimum slot offset (e.g., k0=1, k0=0, and/or the like). In some aspects, the second BWP may be associated with a full maximum number of MIMO layers. As shown by reference number 320, the second BWP may be associated with another monitoring periodicity for the downlink control channel (e.g., Periodicity=1). For example, the second BWP may be associated with monitoring for a DCI message in each slot of the second BWP. In this case, UE 120 may implement a micro-sleep operation to reduce power consumption relative to other techniques for monitoring for the DCI message. For example, UE 120 may implement the microsleep operation when a value for k0 is set to 1.

In some aspects, UE 120 may use the second BWP for relatively high amounts (e.g., not less than a threshold amount) of data activity. Additionally, or alternatively, UE 120 may use the second BWP for relatively low latency levels (e.g., when not greater than a threshold amount of latency is acceptable).

In some aspects, periodicities for a plurality of BWPs may be configured. For example, UE 120 may receive information (e.g., from BS 110) associated with configuring monitoring periodicities for the first BWP, the second BWP, and/or the like. In this case, the monitoring periodicities may be determined based at least in part on a data traffic pattern, a bandwidth, a user equipment capability (e.g., an energy resource availability) and/or the like. In some aspects, the monitoring periodicities may be selected based at least in part on a processing capability of UE 120. For example, a monitoring periodicity of greater than a threshold may be selected to enable a threshold amount of time for downlink channel processing. Additionally, or alternatively, UE 120 may receive information associated with configuring the timing parameter based at least in part on a data traffic pattern, a network characteristic, a user equipment capability, and/or the like.

As indicated above, FIG. 3 is provided as an example. Other examples may differ from what is described with respect to FIG. 3.

Figure 4:
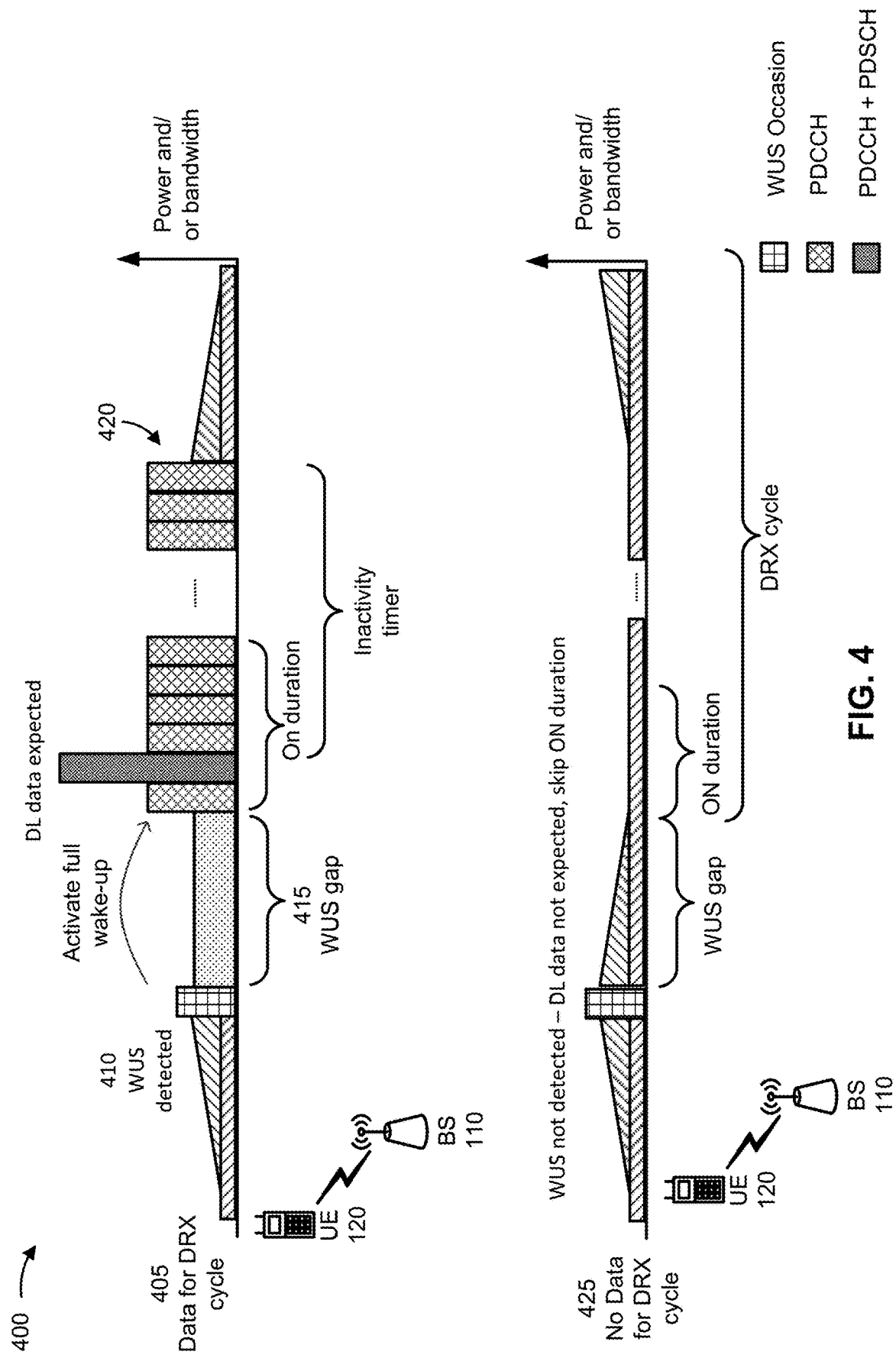
FIG. 4 is a diagram illustrating an example associated with wake-up signal (WUS) technology, in accordance with the present disclosure.

FIG. 4 is a diagram illustrating an example 400 relating to wake-up signaling, in accordance with the present disclosure. As shown in FIG. 4, example 400 includes a UE 120 in communication with a BS 110.

As further shown in FIG. 4, and by reference number 405, in a first scenario a downlink grant may be provided for UE 120. For example, BS 110 may determine that a downlink grant is to be provided to UE 120 during a first DRX cycle period to enable UE 120 to receive queued data from BS 110 during the DRX cycle period. As shown by reference number 410, the UE 120 may detect a wake-up signal (WUS) during a WUS occasion. In some aspects, the WUS may be transmitted by the base station 110 to wake up the UE 120 so that the UE 120 can receive a data transmission. In some aspects, the WUS may include a dedicated PDCCH communication transmitted by the base station 110 before a DRX (e.g., a connected mode DRX (C-DRX)) ON duration to indicate whether the UE 120 should monitor the next DRX ON duration.

In some aspects, the WUS may be associated with a two-stage wake-up procedure. In a first stage, the UE 120 may wake up to a first level for PDCCH-WUS detection. If a WUS is detected and indicates "wake-up", the UE 120 may wake up to a second level for monitoring for scheduling and reception of data. The first level and the second level may correspond to power modes. For example, in some aspects, the first level may be a low power mode and the second level may be a high power mode (a higher power mode than the low power mode). In some aspects, during the first stage, low power mode, a minimal set of hardware may be instantiated for PDCCH-only processing, the operating point in terms of voltage levels and clock frequencies of the hardware may be optimized, a more relaxed PDCCH processing timeline may be implemented, a receive bandwidth may be reduced, a number of candidates and/or aggregation levels for PDCCH may be reduced, and/or the like.

As shown, the UE 120 may take an amount of time to ramp up from a first level of power consumption for PDCCH-WUS detection to a second level of power consumption for monitoring for scheduling and reception of data. As shown by reference 415, a WUS gap may be configured as an amount of time between a WUS occasion and an ON duration associated with the DRX cycle. In some aspects, a WUS occasion may be only a few symbols long. In some aspects, the UE 120 may ramp up according to a warm-up time. The WUS gap may be associated with a minimum warm-up threshold corresponding to the UE 120.

In some aspects, the inactivity timer associated with a DRX sleep mode may be triggered based at least in part on not decoding any grant from PDCCH reception. As shown by reference number 420, based at least in part on expiration of an inactivity timer, UE 120 may transition to DRX sleep mode.

As shown by reference number 425, in a second scenario, a WUS may not be detected by the UE 120. For example, the base station 110 may determine that a downlink grant is not to be provided to UE 120 during a second DRX cycle period (e.g., based at least in part on the base station 110 not having data queued for transmission to UE 120), and may not provide a WUS to wake up the UE 120. As shown, the UE 120 may monitor a downlink channel to receive a WUS and may fail to receive a WUS, or may decode the WUS as "no wake-up." In this case, the UE 120 may not transition from the first BWP to the second BWP based at least in part on the WUS indicating "no wake-up" (or the lack of a WUS) and may transfer from a low-power mode to a sleep mode after completion of a WUS gap.

As indicated above, FIG. 4 is provided as an example. Other examples may differ from what is described with respect to FIG. 4.

Both BWP management (adaptation) and WUSs may facilitate power savings. BWP management primarily achieves power savings by facilitating bandwidth reduction, cross-slot scheduling, reduction of the maximum number of MIMO layers (resulting in a reduced number of required active receive chains), and/or the like. WUS techniques may achieve power savings by minimizing the time and complexity of the signal to be decoded to check whether the UE should expect data scheduling during an upcoming DRX cycle. However, WUS techniques do not control how bandwidth is managed. As a result, a UE may not have enough warm-up time, or transition time, to switch from one BWP to another before an intended downlink transmission arrives. In some cases, a UE may have more than enough time to warm-up, thus resulting in an increase in latency.

Various aspects of the techniques and apparatuses described herein facilitate managing bandwidth reduction using BWP management in connection with management of WUSs. In this way, power savings may be optimized and latency may be reduced. In some aspects, a base station may configure a minimum slot offset based at least in part on a determination of a minimum WUS gap capability associated with the UE. The UE may monitor the PDCCH occasion for a downlink grant based at least in part on the configuration. In this way, a minimum slot offset and a WUS gap size may be jointly managed to ensure enough warm-up time for the UE to wake up and/or to switch BWPs without providing excess time. As a result, aspects may facilitate providing adequate bandwidth and warm-up time without introducing unnecessary latency. In some aspects, bandwidth reduction may be utilized by the UE to manage bandwidth in conjunction with WUS management. In this way, aspects may facilitate power savings without increased signaling overhead.

Figure 5:
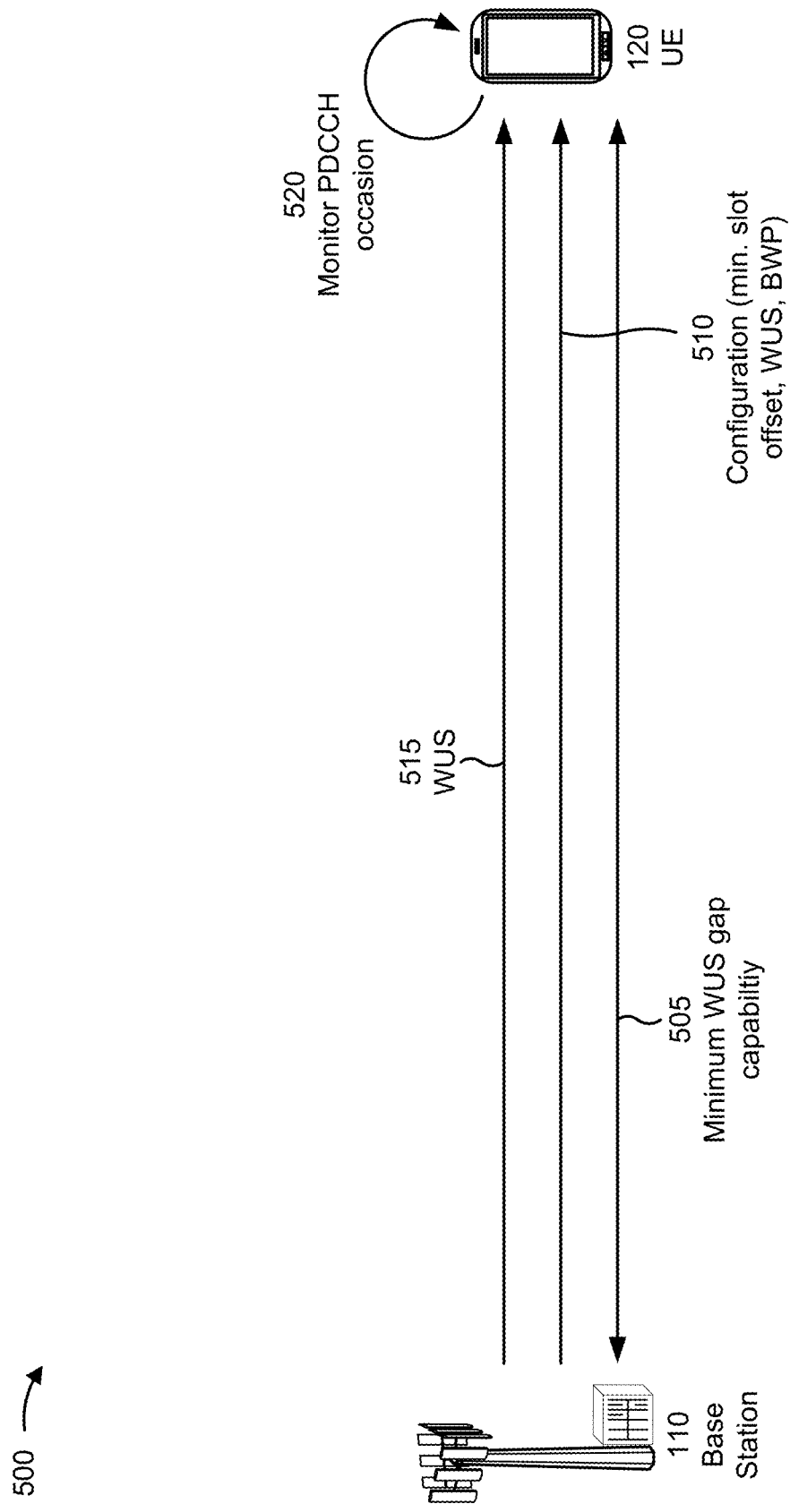
FIGS. 5-8 are diagrams illustrating examples associated with management of WUSs and BWPs, in accordance with the present disclosure.

FIG. 5 is a diagram illustrating an example 500 of management of WUSs and BWPs, in accordance with the present disclosure. As shown in FIG. 5, a base station 110 and a UE 120 may communicate with one another.

As shown by reference number 505, the UE 120 may transmit, and the base station 110 may receive, a minimum WUS gap capability associated with the UE. In some aspects, the minimum WUS gap capability corresponds to a capability of the UE to support a WUS gap having a minimum gap size. In some aspects, the UE 120 may refrain from reporting the minimum WUS gap capability to the base station 110. In those aspects, the base station 110 may determine the minimum WUS gap capability associated with the UE to equal zero. In some aspects, the UE 120 may refrain from reporting the minimum WUS gap capability based at least in part on determining that UE capability signaling does not support reporting a minimum WUS gap capability of less than one slot.

As shown by reference number 510, the base station 110 may transmit, and the UE 120 may receive, a configuration. In some aspects, the configuration may include a configuration of a minimum slot offset. The minimum slot offset may indicate a minimum time period between a physical downlink control channel (PDCCH) occasion and a physical downlink shared channel (PDSCH) occasion scheduled by the PDCCH. In some aspects, the configuration of the minimum slot offset may be based at least in part on the determination of the minimum WUS gap capability associated with the UE. In some aspects, the minimum slot offset may be greater than zero. In some aspects, the configuration of the minimum slot offset may be further based at least in part on a short-cycle connected mode discontinuous reception (C-DRX) configuration associated with the UE.

In some aspects, the configuration may include a configuration of a WUS. The configuration of the WUS may be based at least in part on a WUS gap size. In some aspects, the WUS gap size may be based at least in part on the minimum slot offset and the determination of the minimum WUS gap capability. In some aspects, the configuration of the WUS may indicate a WUS occasion during which the WUS is scheduled. In some aspects, the WUS gap size may satisfy a warm-up threshold. In some aspects, the WUS gap size may be greater than or equal to the minimum WUS gap capability.

In some aspects, the minimum slot offset may satisfy a warm-up threshold and the WUS gap size may include zero slots or one slot. In some aspects, the minimum slot offset may be based at least in part on a BWP switch delay. In some aspects, the minimum slot offset may correspond to a first BWP. The first BWP may include a default BWP. In some aspects, the configuration may further include an additional slot offset configuration corresponding to a second BWP.

In some aspects, the configuration may include a BWP adaptation configuration. The BWP adaptation configuration may indicate a second BWP associated with the PDSCH occasion. In some aspects, the second BWP may include a larger bandwidth than a bandwidth of the first BWP. In some aspects, the configuration may include a BWP configuration associated with the BWP adaptation procedure. In some aspects, the BWP configuration may indicate a first BWP, a second BWP, a default BWP, a BWP switch delay, and/or the like.

As shown by reference number 515, the base station 110 may transmit, and the UE 120 may receive, a WUS. In some aspects, the UE 120 may monitor a WUS occasion based at least in part on a reduced bandwidth associated with a configured BWP. The BWP may have a BWP bandwidth, and the reduced bandwidth may include a narrower bandwidth than the BWP bandwidth. In some aspects, the UE 120 may monitor the WUS occasion using the reduced bandwidth based at least in part on the minimum slot offset satisfying a retuning threshold.

As shown by reference number 520, the UE 120 may monitor the PDCCH occasion for a downlink grant based at least in part on the configuration and based at least in part on detecting the WUS. In some aspects, the UE 120 may monitor a BWP bandwidth. In some aspects, the BWP may include a first control resource set (CORESET) and the reduced bandwidth may include a second CORESET having fewer resources than the first CORESET. In some aspects, the base station 110 may transmit, and the UE 120 may receive, a data transmission. In some aspects, the data transmission may be carried on the BWP bandwidth. In some aspects, the base station 110 may transmit, and the UE 120 may receive, a tracking reference signal (TRS). In some aspects, the TRS may be received at, or within a specified amount of time after, a start of an active period of a DRX cycle.

As indicated above, FIG. 5 is provided as an example. Other examples may differ from what is described with respect to FIG. 5.

Figure 6:
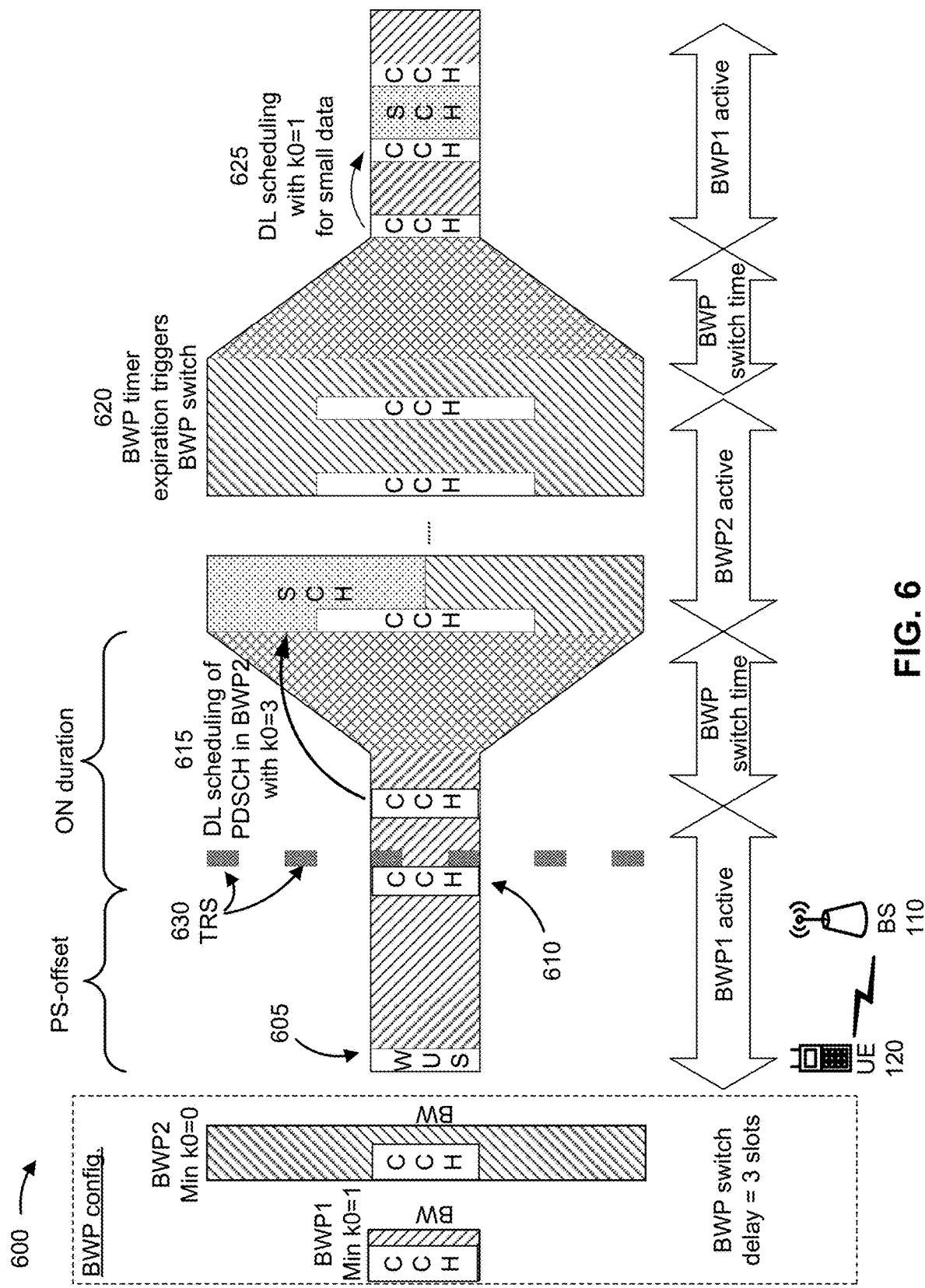

FIG. 6 is a diagram illustrating an example 600 associated with management of WUSs and BWPs, in accordance with the present disclosure. As shown in FIG. 6, example 600 includes a UE 120 communicating with a BS 110 using a set of two or more BWPs. In some aspects, the set of BWPs may include a first BWP (BWP1) with a first bandwidth (BW), and a second BWP (BWP2) with a second bandwidth that is greater than the first bandwidth.

In some aspects, the minimum slot offset configured for the two or more BWPs can be different. For example, the minimum slot offset may be configured at least semi-statically. In some aspects, BWP1 may have a minimum k0 configured to 1 (slot) (e.g., cross-slot scheduling); BWP2 may have a minimum k0 configured to 0 (slots) (e.g., same slot scheduling); and/or the like. In this way, a network may enable reduction in power utilization by permitting different levels of cross-slot scheduling, which may enable power utilization savings, relative to other techniques, by allowing more time for processing and allowing the modem to operate at a lower voltage and a lower clock frequency.

In some aspects, the UE 120 may transition between BWPs based at least in part on a size of data that is to be transmitted. For example, as shown by reference number 605, the UE 120 may monitor, in a low-power mode, on BWP1, for a WUS. In some aspects, the WUS may be configured so that it is transmitted when the UE 120 is monitoring BWP1, which may be a default BWP. Upon detecting the WUS, UE 120 may monitor on BWP1 for a control channel (CCH) transmission. In some aspects, a BWP switch may not be triggered in a WUS. In some aspects, when the UE 120 is indicated to wake up, via the WUS, the UE 120 will start an ON duration of a DRX in a default BWP (e.g., BWP1, in FIG. 6).

As shown by reference number 610, the UE 120 may receive a CCH corresponding to a beginning of the ON duration of the DRX. As shown by reference number 615, the UE 120 may receive another CCH that schedules a data transmission via a shared channel (SCH) (e.g., a PDSCH). The CCH transmissions may include, for example, DCI. As shown, the data may be scheduled using a slot offset of k0=3. The scheduling CCH may trigger the UE 120 to transition to BWP2 during a warm-up period (shown as "BWP switch time"), thereby enabling the UE 120 to receive the data. In some aspects, the warm-up period may include a WUS gap. In some aspects, the WUS gap may be a part of a power saving offset (shown as "ps_offset").

As shown by reference number 620, expiration of a BWP timer (e.g., an inactivity timer) may trigger a BWP switch, causing the UE 120 to switch back to BWP1 during a second BWP switch time. As shown by reference number 625, while BWP1 is active, a CCH transmission may be received that schedules a small amount of data (e.g., an amount of data that satisfies a bandwidth threshold) that can be transmitted via BWP1. As shown, the data may be scheduled using a slot offset of k0=1. As is further shown by reference number 630, the base station 110 may transmit, and the UE 120 may receive, a tracking reference signal (TRS) at, or within a specified amount of time after, the start of the active period ("ON duration") of the DRX cycle. In this way, the TRS may be received in a power-efficient manner since the UE 120 will already be active and expecting data.

In some aspects, a similar BWP configuration may be implemented by the base station for receiving uplink transmissions from the UE 120. This may include receiving a channel state information reference signal (CSI-RS) from the UE 120 at, or within a specified amount of time after, a start of an active period of a DRX cycle.

As indicated above, FIG. 6 is provided as an example. Other examples may differ from what is described with respect to FIG. 6.

Figure 7:
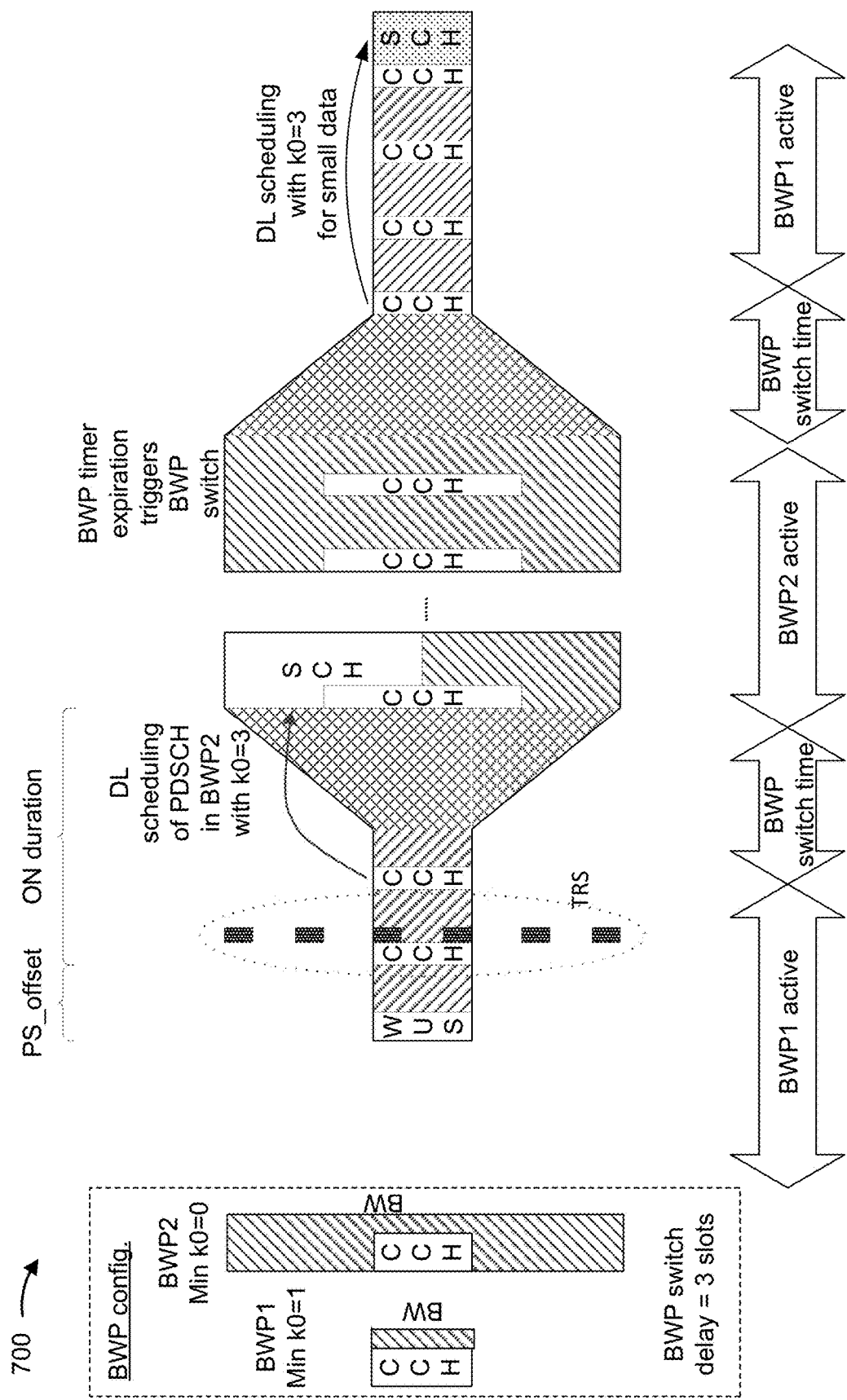

FIG. 7 is a diagram illustrating an example 700 associated with management of WUSs and BWPs, in accordance with the present disclosure. As shown in FIG. 7, example 700 includes a UE 120 communicating with a base station 110 using a set of two or more BWPs. In some aspects, the set of BWPs may include a first BWP (BWP1) with a first bandwidth (BW), and a second BWP (BWP2) with a second bandwidth that is greater than the first bandwidth.

Various aspects of FIG. 7 may be the same as, or similar to, corresponding aspects shown in FIG. 6, but in FIG. 7, a zero-slot, or one-slot, WUS gap (corresponding to the PS offset) is configured between the WUS occasion and the start of the active ("ON") duration of the DRX cycle. In some aspects, the WUS is received in low-power mode (via BWP1). A scheduling CCH transmission may also be received by the UE 120 in the low-power mode, as shown.

In some aspects, the minimum slot offset configured for the two or more BWPs can be different. For example, the minimum slot offset may be configured at least semi-statically. In this case, BWP1 may have a minimum k0 configured to 3 (slots) (e.g., cross-slot scheduling); BWP2 may have a minimum k0 configured to 0 (slots) (e.g., same slot scheduling); and/or the like. In some aspects, BWP1 may be configured with a large minimum slot offset (e.g., k0=3 slots) to ensure that the UE 120 has enough time for warm-up to transition to BWP2 before receiving the scheduled SCH transmission. In some aspects, as shown in FIG. 7, the minimum slot offset may be based at least in part on a BWP switch delay (e.g., 3 milliseconds for a 15 kilohertz subcarrier spacing numerology).

As indicated above, FIG. 7 is provided as an example. Other examples may differ from what is described with respect to FIG. 7.

Figure 8:
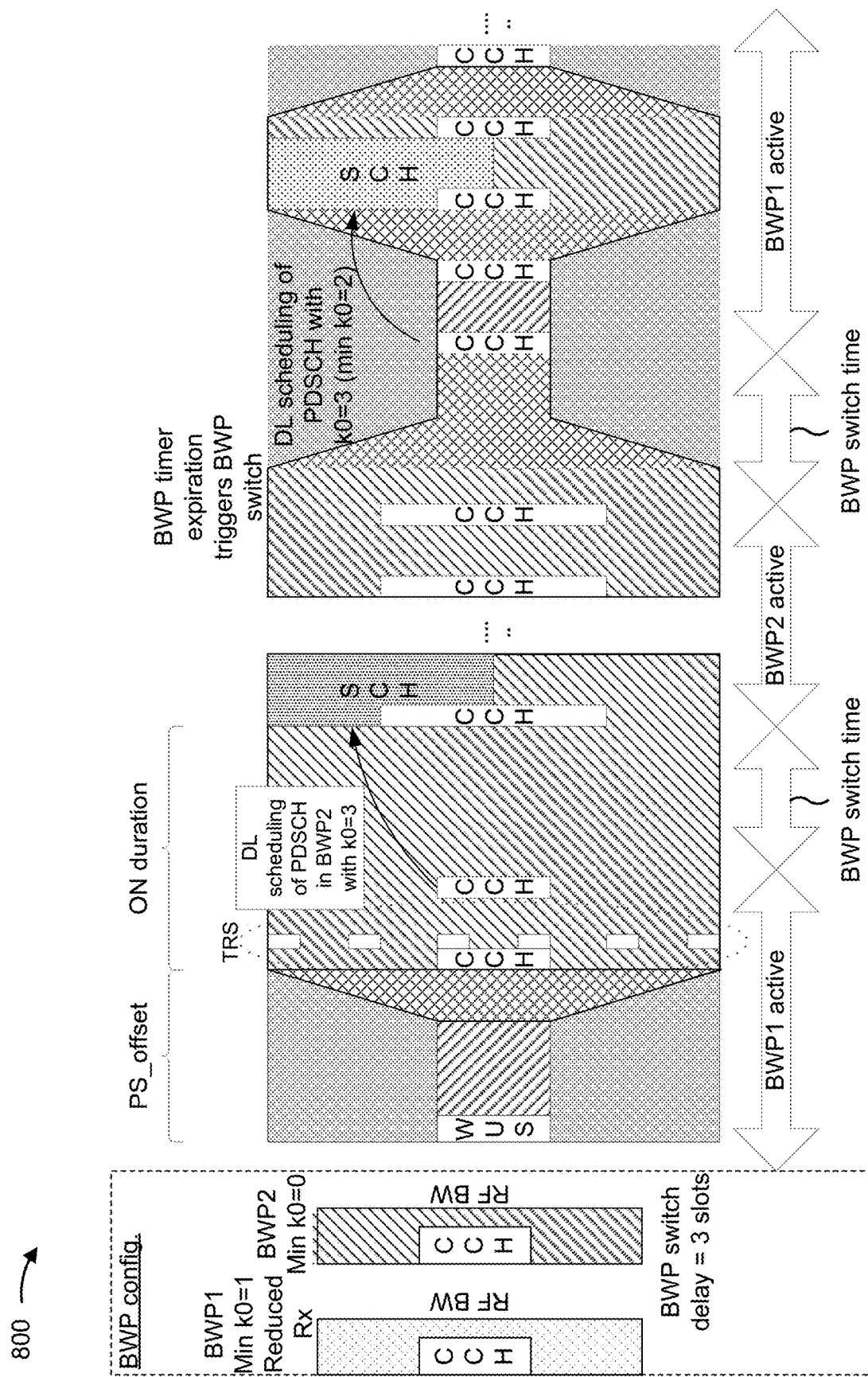

FIG. 8 is a diagram illustrating an example 800 associated with management of WUSs and BWPs, in accordance with the present disclosure. As shown in FIG. 8, example 800 includes a UE 120 communicating with a base station 110 using a set of two or more BWPs. In some aspects, the set of BWPs may include a first BWP (BWP1) with a first bandwidth (BW), and a second BWP (BWP2) with a second bandwidth that is greater than the first bandwidth.

Various aspects of FIG. 8 may be the same as, or similar to, corresponding aspects shown in FIGS. 6 and 7, but in FIG. 8, the UE 120 may monitor a WUS occasion based at least in part on a reduced bandwidth (shown as "Reduced Rx") associated with BWP1. In some aspects, the reduced bandwidth may include a narrower bandwidth than the BWP1 bandwidth. In some aspects, the UE 120 may perform bandwidth reduction when BWP adaptation is not enabled, when BWP adaptation is enabled but BWP1 is configured to have the same bandwidth as BWP2, and/or the like.

For example, in some aspects, BWP1 may include a first CORESET and the reduced bandwidth may include a second CORESET that comprises fewer resources than the first CORESET. In some aspects, BWP switching may be used for rapid adaptation of CORESET configuration parameters. In some aspects, the UE 120 may use a narrow CORESET for monitoring the WUS occasion, keeping bandwidth as small as possible. When the UE 120 detects the WUS and is preparing to wake up for an active duration of a DRX cycle, the UE 120 may open up the bandwidth fully, effectively switching to the full bandwidth of BWP 1. The WUS gap may be used as a warm-up time. In some aspects, the UE 120 may monitor the WUS occasion using the reduced bandwidth based at least in part on the minimum slot offset satisfying a retuning threshold. In some aspects, for example, the retuning threshold may include one slot.

As indicated above, FIG. 8 is provided as an example. Other examples may differ from what is described with respect to FIG. 8.

Figure 9:
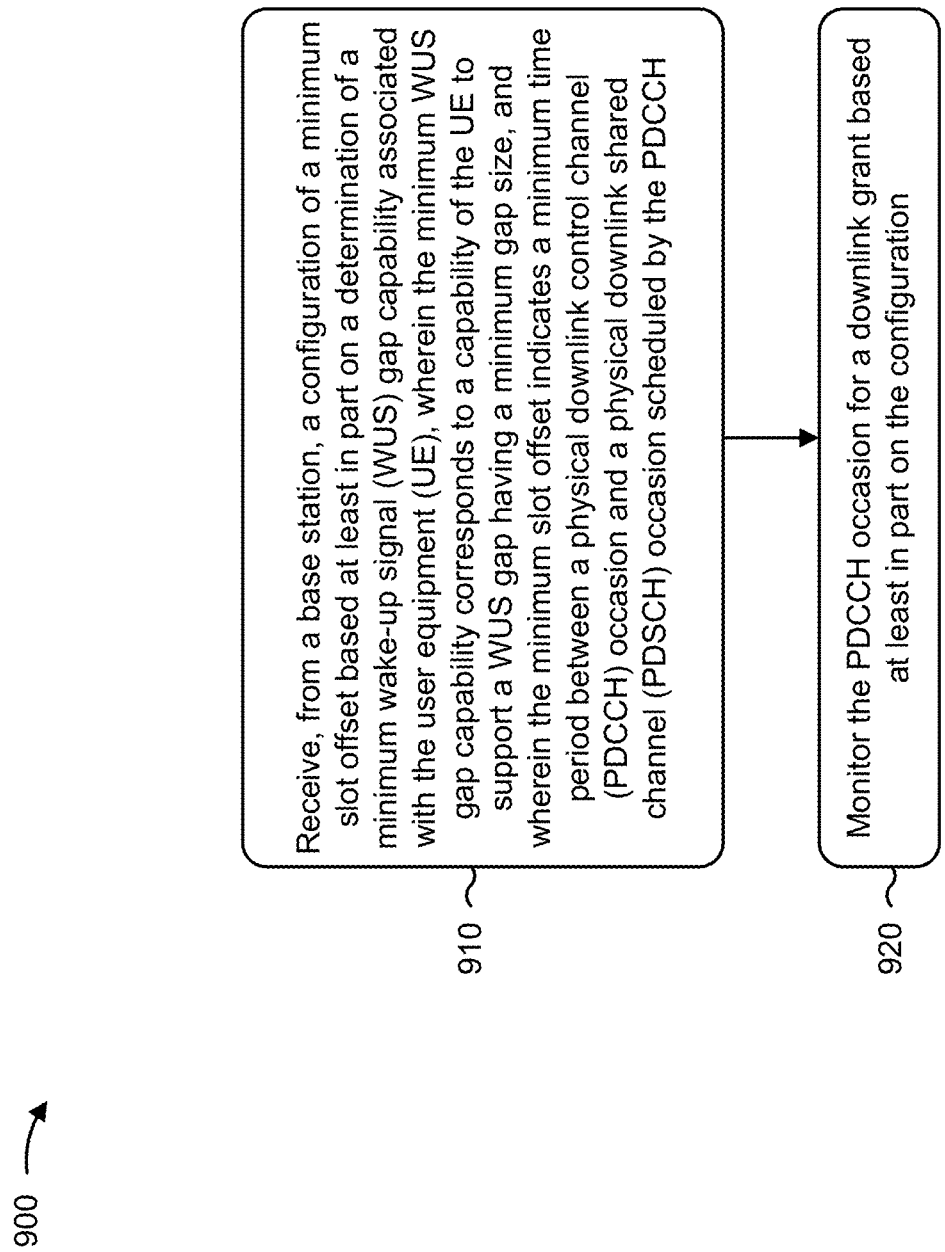
FIGS. 9-10 are diagrams illustrating example processes associated with management of WUSs and BWPs, in accordance with the present disclosure.

FIG. 9 is a diagram illustrating an example process 900 performed, for example, by a UE, in accordance with the present disclosure. Example process 900 is an example where the UE (e.g., UE 120 and/or the like) performs operations associated with management of WUSs and BWPs.

As shown in FIG. 9, in some aspects, process 900 may include receiving, from a base station, a configuration of a minimum slot offset based at least in part on a determination of a minimum WUS gap capability associated with the UE, wherein the minimum WUS gap capability corresponds to a capability of the UE to support a WUS gap having a minimum gap size, and wherein the minimum slot offset indicates a minimum time period between a PDCCH occasion and a PDSCH occasion scheduled by the PDCCH (block 910). For example, the UE (e.g., using receive processor 258, controller/processor 280, memory 282, and/or the like) may receive, from a base station, a configuration of a minimum slot offset based at least in part on a determination of a minimum WUS gap capability associated with the UE, as described above. In some aspects, the minimum WUS gap capability corresponds to a capability of the UE to support a WUS gap having a minimum gap size. In some aspects, the minimum slot offset indicates a minimum time period between a PDCCH occasion and a PDSCH occasion scheduled by the PDCCH.

As further shown in FIG. 9, in some aspects, process 900 may include monitoring the PDCCH occasion for a downlink grant based at least in part on the configuration (block 920). For example, the UE (e.g., using receive processor 258, controller/processor 280, memory 282, and/or the like) may monitor the PDCCH occasion based at least in part on the configuration, as described above.

Process 900 may include additional aspects, such as any single aspect or any combination of aspects described below and/or in connection with one or more other processes described elsewhere herein.

In a first aspect, the minimum slot offset is greater than zero.

In a second aspect, alone or in combination with the first aspect, the configuration of the minimum slot offset is further based at least in part on a short-cycle C-DRX configuration associated with the UE.

In a third aspect, alone or in combination with one or more of the first and second aspects, process 900 includes receiving a configuration of a WUS based at least in part on a WUS gap size, wherein the WUS gap size is based at least in part on the minimum slot offset and the determination of the minimum WUS gap capability.

In a fourth aspect, alone or in combination with the third aspect, the configuration of the WUS indicates a WUS occasion during which the WUS is scheduled.

In a fifth aspect, alone or in combination with one or more of the third through fourth aspects, the WUS gap size satisfies a warm-up threshold, and the WUS gap size is greater than or equal to the minimum WUS gap capability.

In a sixth aspect, alone or in combination with one or more of the third through fifth aspects, the minimum slot offset satisfies a warm-up threshold and the WUS gap size comprises zero slots or one slot.

In a seventh aspect, alone or in combination with one or more of the first through sixth aspects, the minimum slot offset is based at least in part on a BWP switch delay.

In an eighth aspect, alone or in combination with one or more of the first through seventh aspects, the minimum slot offset corresponds to a first BWP, the first BWP comprising a default BWP.

In a ninth aspect, alone or in combination with the eighth aspect, process 900 includes receiving an additional slot offset configuration corresponding to a second BWP.

In a tenth aspect, alone or in combination with one or more of the eighth through ninth aspects, process 900 includes receiving a BWP adaptation configuration that indicates a second BWP associated with the PDSCH occasion.

In an eleventh aspect, alone or in combination with the tenth aspect, the second BWP comprises a larger bandwidth than a bandwidth of the first BWP.

In a twelfth aspect, alone or in combination with one or more of the first through eleventh aspects, process 900 includes receiving a BWP configuration associated with a BWP adaptation procedure, wherein the BWP configuration indicates at least one of a first BWP, a second BWP, a default BWP, a BWP switch delay, or a combination thereof.

In a thirteenth aspect, alone or in combination with one or more of the first through twelfth aspects, process 900 includes reporting, to the base station, the minimum WUS gap capability associated with the UE.

In a fourteenth aspect, alone or in combination with one or more of the first through thirteenth aspects, process 900 includes refraining from reporting the minimum WUS gap capability to the base station, wherein the determination of the minimum WUS gap capability associated with the UE results in a determined minimum WUS gap capability that equals zero based at least in part on the UE refraining from reporting the minimum WUS gap capability.

In a fifteenth aspect, alone or in combination with the fourteenth aspect, refraining from reporting the minimum WUS gap capability comprises refraining from reporting the minimum WUS gap capability based at least in part on determining that UE capability signaling does not support reporting a minimum WUS gap capability of less than one slot.

In a sixteenth aspect, alone or in combination with one or more of the first through fifteenth aspects, process 900 includes receiving a TRS, wherein the TRS is received at, or within a specified amount of time after, a start of an active period of a discontinuous reception cycle.

In a seventeenth aspect, alone or in combination with one or more of the first through sixteenth aspects, process 900 includes monitoring a WUS occasion based at least in part on a reduced bandwidth associated with a configured BWP, the BWP comprising a BWP bandwidth, wherein the reduced bandwidth comprises a narrower bandwidth than the BWP bandwidth.

In an eighteenth aspect, alone or in combination with the seventeenth aspect, the BWP comprises a first CORESET and the reduced bandwidth comprises a second CORESET that comprises fewer resources than the first CORESET.

In a nineteenth aspect, alone or in combination with one or more of the seventeenth through eighteenth aspects, process 900 includes detecting a WUS associated with the WUS occasion, and monitoring the BWP bandwidth based at least in part on detecting the WUS.

In a twentieth aspect, alone or in combination with one or more of the seventeenth through nineteenth aspects, process 900 includes receiving a data transmission carried on the BWP bandwidth.

In a twenty-first aspect, alone or in combination with one or more of the seventeenth through twentieth aspects, monitoring the WUS occasion based at least in part on the reduced bandwidth is based at least in part on the minimum slot offset satisfying a retuning threshold.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
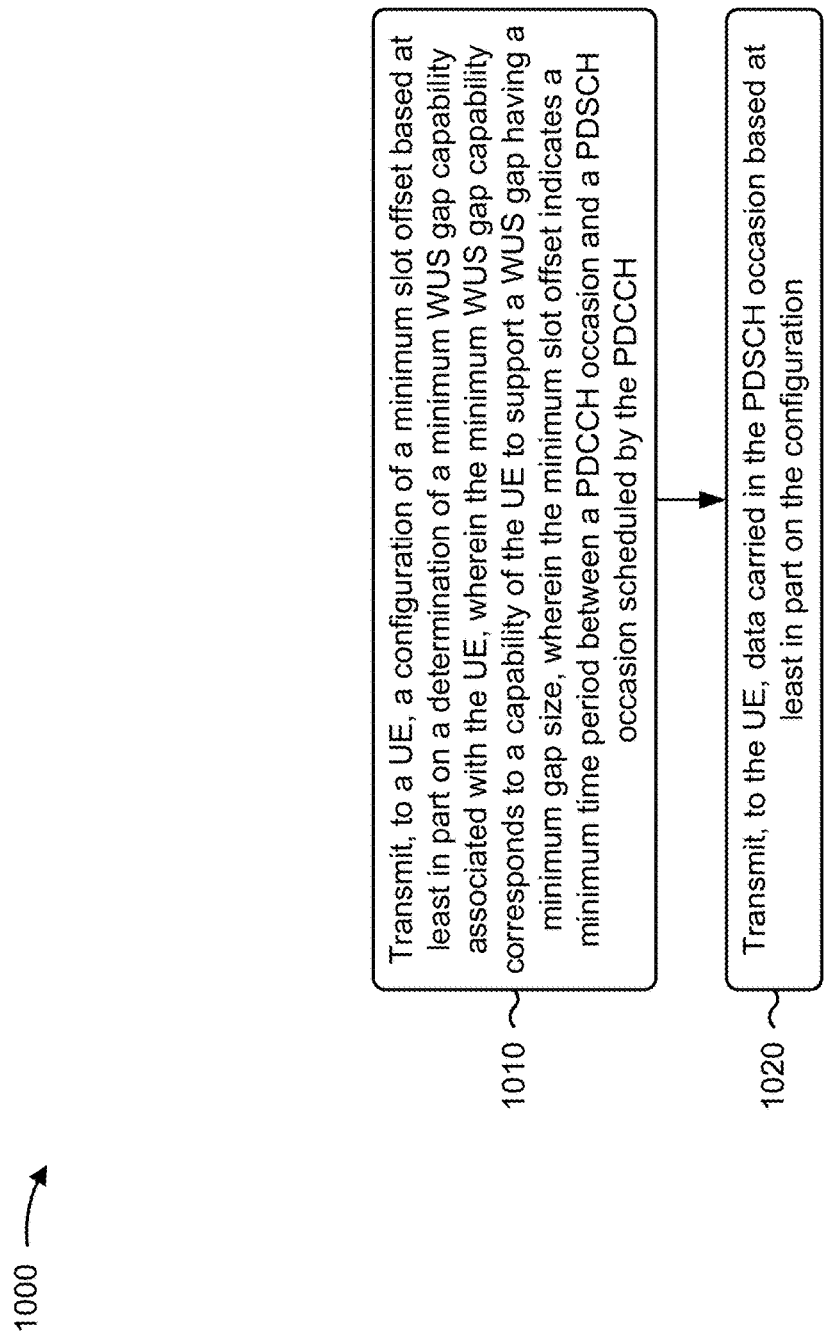

FIG. 10 is a diagram illustrating an example process 1000 performed, for example, by a base station, in accordance with the present disclosure. Example process 1000 is an example where the base station (e.g., base station 110 and/or the like) performs operations associated with management of WUSs and BWPs.

As shown in FIG. 10, in some aspects, process 1000 may include transmitting, to a UE, a configuration of a minimum slot offset based at least in part on a determination of a minimum WUS gap capability associated with the UE, wherein the minimum WUS gap capability corresponds to a capability of the UE to support a WUS gap having a minimum gap size, and wherein the minimum slot offset indicates a minimum time period between a PDCCH occasion and a PDSCH occasion scheduled by the PDCCH (block 1010). For example, the base station (e.g., using transmit processor 220, controller/processor 240, memory 242, and/or the like) may transmit, to a UE, a configuration of a minimum slot offset based at least in part on a determination of a minimum WUS gap capability associated with the UE, as described above. In some aspects, the minimum WUS gap capability corresponds to a capability of the UE to support a WUS gap having a minimum gap size. In some aspects, the minimum slot offset indicates a minimum time period between a PDCCH occasion and a PDSCH occasion scheduled by the PDCCH.

As further shown in FIG. 10, in some aspects, process 1000 may include transmitting, to the UE, data carried in the PDSCH occasion based at least in part on the configuration (block 1020). For example, the base station (e.g., using transmit processor 220, controller/processor 240, memory 242, and/or the like) may transmit, to the UE, data carried in the PDSCH occasion based at least in part on the configuration, as described above.

Process 1000 may include additional aspects, such as any single aspect or any combination of aspects described below and/or in connection with one or more other processes described elsewhere herein.

In a first aspect, the minimum slot offset is greater than zero.

In a second aspect, alone or in combination with the first aspect, the configuration of the minimum slot offset is further based at least in part on a short-cycle C-DRX configuration associated with the UE.

In a third aspect, alone or in combination with one or more of the first and second aspects, process 1000 includes transmitting, to the UE, a configuration of a WUS based at least in part on a WUS gap size, wherein the WUS gap size is based at least in part on the minimum slot offset and the determination of the minimum WUS gap capability.

In a fourth aspect, alone or in combination with the third aspect, the configuration of the WUS indicates a WUS occasion during which the WUS is scheduled.

In a fifth aspect, alone or in combination with one or more of the third through fourth aspects WUS gap size satisfies a warm-up threshold, and the WUS gap size is greater than or equal to the minimum WUS gap capability.

In a sixth aspect, alone or in combination with one or more of the third through fifth aspects, the minimum slot offset satisfies a warm-up threshold and the WUS gap size comprises zero slots or one slot.

In a seventh aspect, alone or in combination with one or more of the first through sixth aspects, the minimum slot offset is based at least in part on a BWP switch delay.

In an eighth aspect, alone or in combination with one or more of the first through seventh aspects, the minimum slot offset corresponds to a first BWP, the first BWP comprising a default BWP.

In a ninth aspect, alone or in combination with the eighth aspect, process 1000 includes transmitting, to the UE, an additional slot offset configuration corresponding to a second BWP.

In a tenth aspect, alone or in combination with one or more of the eighth through ninth aspects, process 1000 includes transmitting, to the UE, a BWP adaptation configuration that indicates a second BWP associated with the PDSCH occasion.

In an eleventh aspect, alone or in combination with the tenth aspect, the second BWP comprises a larger bandwidth than a bandwidth of the first BWP.

In a twelfth aspect, alone or in combination with one or more of the first through eleventh aspects, process 1000 includes transmitting, to the UE, a BWP configuration associated with a BWP adaptation procedure, wherein the BWP configuration indicates at least one of a first BWP, a second BWP, a default BWP, a BWP switch delay, or a combination thereof.

In a thirteenth aspect, alone or in combination with one or more of the first through twelfth aspects, process 1000 includes receiving, from the UE, the minimum WUS gap capability associated with the UE.

In a fourteenth aspect, alone or in combination with one or more of the first through thirteenth aspects, process 1000 includes determining that the minimum WUS gap capability associated with the UE equals zero based at least in part on the UE refraining from reporting the minimum WUS gap capability.

In a fifteenth aspect, alone or in combination with one or more of the first through fourteenth aspects, process 1000 includes transmitting, to the UE, a TRS, wherein the TRS is transmitted at, or within a specified amount of time after, a start of an active period of a discontinuous reception cycle.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: receiving, from a base station, a configuration of a minimum slot offset based at least in part on a determination of a minimum wake-up signal (WUS) gap capability associated with the UE, wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion scheduled by the PDCCH; and monitoring the PDCCH occasion for a downlink grant based at least in part on the configuration.

Aspect 2: The method of Aspect 1, wherein the minimum slot offset is greater than zero.

Aspect 3: The method of either of Aspects 1 or 2, wherein the configuration of the minimum slot offset is further based at least in part on a short-cycle connected mode discontinuous reception (C-DRX) configuration associated with the UE.

Aspect 4: The method of any of Aspects 1-3, further comprising receiving a configuration of a WUS based at least in part on a WUS gap size, wherein the WUS gap size is based at least in part on the minimum slot offset and the determination of the minimum WUS gap capability.

Aspect 5: The method of Aspect 4, wherein the configuration of the WUS indicates a WUS occasion during which the WUS is scheduled.

Aspect 6: The method of either of Aspects 4 or 5, wherein WUS gap size satisfies a warm-up threshold, and wherein the WUS gap size is greater than or equal to the minimum WUS gap capability.

Aspect 7: The method of any of Aspects 4-6, wherein the minimum slot offset satisfies a warm-up threshold and the WUS gap size comprises zero slots or one slot.

Aspect 8: The method of any of Aspects 1-7, wherein the minimum slot offset is based at least in part on a bandwidth part switch delay.

Aspect 9: The method of any of Aspects 1-8, wherein the minimum slot offset corresponds to a first bandwidth part (BWP), the first BWP comprising a default BWP.

Aspect 10: The method of Aspect 9, further comprising receiving an additional slot offset configuration corresponding to a second BWP.

Aspect 11: The method of either of Aspects 9 or 10, further comprising receiving a BWP adaptation configuration that indicates a second BWP associated with the PDSCH occasion.

Aspect 12: The method of Aspect 11, wherein the second BWP comprises a larger bandwidth than a bandwidth of the first BWP.

Aspect 13: The method of any of Aspects 1-12, further comprising receiving a bandwidth part (BWP) configuration associated with a BWP adaptation procedure, wherein the BWP configuration indicates at least one of: a first BWP, a second BWP, a default BWP, a BWP switch delay, or a combination thereof.

Aspect 14: The method of any of Aspects 1-13, further comprising reporting, to the base station, the minimum WUS gap capability associated with the UE.

Aspect 15: The method of any of Aspects 1-14, further comprising: refraining from reporting the minimum WUS gap capability to the base station, wherein the determination of the minimum WUS gap capability associated with the UE results in a determined minimum WUS gap capability that equals zero based at least in part on the UE refraining from reporting the minimum WUS gap capability.

Aspect 16: The method of Aspect 15, wherein refraining from reporting the minimum WUS gap capability comprises refraining from reporting the minimum WUS gap capability based at least in part on determining that UE capability signaling does not support reporting a minimum WUS gap capability of less than one slot.

Aspect 17: The method of any of Aspects 1-16, further comprising receiving a tracking reference signal (TRS), wherein the TRS is received at, or within a specified amount of time after, a start of an active period of a discontinuous reception cycle.

Aspect 18: The method of any of Aspects 1-17, further comprising monitoring a WUS occasion based at least in part on a reduced bandwidth associated with a configured bandwidth part (BWP), the BWP comprising a BWP bandwidth, wherein the reduced bandwidth comprises a narrower bandwidth than the BWP bandwidth.

Aspect 19: The method of Aspect 18, wherein the BWP comprises a first control resource set (CORESET) and the reduced bandwidth comprises a second CORESET that comprises fewer resources than the first CORESET.

Aspect 20: The method of either of Aspects 18 or 19, further comprising: detecting a WUS associated with the WUS occasion; and monitoring the BWP bandwidth based at least in part on detecting the WUS.

Aspect 21: The method of any of Aspects 18-20, further comprising receiving a data transmission carried on the BWP bandwidth.

Aspect 22: The method of any of Aspects 18-21, wherein monitoring the WUS occasion based at least in part on the reduced bandwidth is based at least in part on the minimum slot offset satisfying a retuning threshold.

Aspect 23: A method of wireless communication performed by a base station, comprising: transmitting, to a user equipment (UE), a configuration of a minimum slot offset based at least in part on a determination of a minimum wake-up signal (WUS) gap capability associated with the UE, wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion scheduled by the PDCCH; and transmitting, to the UE, data carried in the PDSCH occasion based at least in part on the configuration.

Aspect 24: The method of Aspect 23, wherein the minimum slot offset is greater than zero.

Aspect 25: The method of either of Aspects 23 or 24, wherein the configuration of the minimum slot offset is further based at least in part on a short-cycle connected mode discontinuous reception (C-DRX) configuration associated with the UE.

Aspect 26: The method of any of Aspects 23-25, further comprising transmitting, to the UE, a configuration of a WUS based at least in part on a WUS gap size, wherein the WUS gap size is based at least in part on the minimum slot offset and the determination of the minimum WUS gap capability.

Aspect 27: The method of Aspect 26, wherein the configuration of the WUS indicates a WUS occasion during which the WUS is scheduled.

Aspect 28: The method of either of Aspects 26 or 27, wherein WUS gap size satisfies a warm-up threshold, and wherein the WUS gap size is greater than or equal to the minimum WUS gap capability.

Aspect 29: The method of any of Aspects 26-28, wherein the minimum slot offset satisfies a warm-up threshold and the WUS gap size comprises zero slots or one slot.

Aspect 30: The method of any of Aspects 23-29, wherein the minimum slot offset is based at least in part on a bandwidth part switch delay.

Aspect 31: The method of any of Aspects 23-30, wherein the minimum slot offset corresponds to a first bandwidth part (BWP), the first BWP comprising a default BWP.

Aspect 32: The method of Aspect 31, further comprising transmitting, to the UE, an additional slot offset configuration corresponding to a second BWP.

Aspect 33: The method of either of Aspects 31 or 32, further comprising transmitting, to the UE, a BWP adaptation configuration that indicates a second BWP associated with the PDSCH occasion.

Aspect 34: The method of Aspect 33, wherein the second BWP comprises a larger bandwidth than a bandwidth of the first BWP.

Aspect 35: The method of any of Aspects 23-34, further comprising transmitting, to the UE, a bandwidth part (BWP) configuration associated with a BWP adaptation procedure, wherein the BWP configuration indicates at least one of: a first BWP, a second BWP, a default BWP, a BWP switch delay, or a combination thereof.

Aspect 36: The method of any of Aspects 23-35, further comprising receiving, from the UE, the minimum WUS gap capability associated with the UE.

Aspect 37: The method of any of Aspects 23-36, further comprising determining that the minimum WUS gap capability associated with the UE equals zero based at least in part on the UE refraining from reporting the minimum WUS gap capability.

Aspect 38: The method of any of Aspects 23-37, further comprising transmitting, to the UE, a tracking reference signal (TRS), wherein the TRS is transmitted at, or within a specified amount of time after, a start of an active period of a discontinuous reception cycle.

Aspect 39: An apparatus for wireless communication at a device, comprising a processor; memory coupled with the processor; and instructions stored in the memory and executable by the processor to cause the apparatus to perform the method of one or more of Aspects 1-22.

Aspect 40: A device for wireless communication, comprising a memory and one or more processors coupled to the memory, the one or more processors configured to perform the method of one or more of Aspects 1-22.

Aspect 41: An apparatus for wireless communication, comprising at least one means for performing the method of one or more of Aspects 1-22.

Aspect 42: A non-transitory computer-readable medium storing code for wireless communication, the code comprising instructions executable by a processor to perform the method of one or more of Aspects 1-22.

Aspect 43: A non-transitory computer-readable medium storing a set of instructions for wireless communication, the set of instructions comprising one or more instructions that, when executed by one or more processors of a device, cause the device to perform the method of one or more of Aspects 1-22.

Aspect 44: An apparatus for wireless communication at a device, comprising a processor; memory coupled with the processor; and instructions stored in the memory and executable by the processor to cause the apparatus to perform the method of one or more of Aspects 23-38.

Aspect 45: A device for wireless communication, comprising a memory and one or more processors coupled to the memory, the one or more processors configured to perform the method of one or more of Aspects 23-38.

Aspect 46: An apparatus for wireless communication, comprising at least one means for performing the method of one or more of Aspects 23-38.

Aspect 47: A non-transitory computer-readable medium storing code for wireless communication, the code comprising instructions executable by a processor to perform the method of one or more of Aspects 23-38.

Aspect 48: A non-transitory computer-readable medium storing a set of instructions for wireless communication, the set of instructions comprising one or more instructions that, when executed by one or more processors of a device, cause the device to perform the method of one or more of Aspects 23-38.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication, comprising:
one or more memories comprising instructions; and
one or more processors, configured to execute the instructions and cause the apparatus to:
obtain a configuration of a minimum slot offset and a configuration of a wake-up signal (WUS),
wherein the configuration of the minimum slot offset is based at least in part on a minimum WUS gap capability associated with the apparatus, wherein the minimum WUS gap capability corresponds to a capability of the apparatus to support a WUS gap having a minimum gap size, wherein the minimum slot offset indicates a minimum time period between a physical downlink control channel (PDCCH) occasion and a physical downlink shared channel (PDSCH) occasion, and
wherein the configuration of the WUS is based at least in part on a WUS gap size, wherein the WUS gap size is based at least in part on the minimum slot offset and the minimum WUS gap capability; and
monitor the PDCCH occasion based at least in part on the configuration of the minimum slot offset and the configuration of the WUS.

2. The apparatus of claim 1, wherein the one or more processors are further configured to cause the apparatus to monitor a WUS occasion, associated with the WUS, based at least in part on a reduced bandwidth associated with a configured bandwidth part (BWP), the configured BWP comprising a BWP bandwidth, wherein the reduced bandwidth comprises a narrower bandwidth than the BWP bandwidth, wherein the configured BWP comprises a first control resource set (CORESET) and the reduced bandwidth comprises a second CORESET that comprises fewer resources than the first CORESET.

3. The apparatus of claim 2, wherein the one or more processors are further configured to cause the apparatus to:
detect the WUS; and
monitor the BWP bandwidth after detecting the WUS.

4. The apparatus of claim 2, wherein the one or more processors are further configured to receive cause the apparatus to obtain a data transmission carried on the BWP bandwidth.

5. The apparatus of claim 2, wherein the one or more processors, to cause the apparatus to monitor the WUS occasion based at least in part on the reduced bandwidth, are configured to cause the apparatus to monitor the WUS occasion further based on the minimum slot offset satisfying a retuning threshold.

6. The apparatus of claim 1, wherein the minimum slot offset is greater than zero.

7. The apparatus of claim 1, wherein the configuration of the minimum slot offset is further based at least in part on a short-cycle connected mode discontinuous reception (C-DRX) configuration associated with the apparatus.

8. The apparatus of claim 1, wherein the WUS gap size satisfies a warm-up threshold, and wherein the WUS gap size is greater than or equal to the minimum WUS gap capability.

9. The apparatus of claim 1, wherein the minimum slot offset satisfies a warm-up threshold and the WUS gap size comprises zero slots or one slot.

10. The apparatus of claim 1, wherein the minimum slot offset is based at least in part on a bandwidth part switch delay.

11. The apparatus of claim 1, wherein the minimum slot offset corresponds to a first bandwidth part (BWP), the first BWP comprising a default BWP.

12. The apparatus of claim 11, wherein the one or more processors are further configured to cause the apparatus to obtain an additional slot offset configuration corresponding to a second BWP.

13. The apparatus of claim 11, wherein the one or more processors are further configured to cause the apparatus to obtain a BWP adaptation configuration that indicates a second BWP associated with the PDSCH occasion, wherein the second BWP comprises a larger bandwidth than a bandwidth of the first BWP.

14. The apparatus of claim 1, wherein the one or more processors are further configured to cause the apparatus to obtain a bandwidth part (BWP) configuration associated with a BWP adaptation procedure, wherein the BWP configuration indicates at least one of:
a first BWP,
a second BWP,
a default BWP,
a BWP switch delay, or
a combination thereof.

15. The apparatus of claim 1, wherein the one or more processors are further configured to cause the apparatus to output for transmission the minimum WUS gap capability associated with the apparatus.

16. The apparatus of claim 1, wherein the one or more processors are further configured to cause the apparatus to obtain a tracking reference signal (TRS), wherein the TRS is obtained at, or within a specified amount of time after, a start of an active period of a discontinuous reception cycle.

17. An apparatus for wireless communication, comprising:
one or more memories comprising instructions; and
one or more processors configured to execute the instructions and cause the apparatus to:
output a configuration of a minimum slot offset and a configuration of a wake-up signal (WUS),
wherein the configuration of the minimum slot offset is based at least in part on a minimum WUS gap capability associated with a user equipment (UE), wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion, and
wherein the configuration of the WUS is based at least in part on a WUS gap size, wherein the WUS gap size is based at least in part on the minimum slot offset and the minimum WUS gap capability; and output data carried in the PDSCH occasion based at least in part on the configuration of the minimum slot offset and the configuration of the WUS.

18. The apparatus of claim 17, wherein the configuration of the minimum slot offset is further based at least in part on a short-cycle connected mode discontinuous reception (C-DRX) configuration associated with the UE.

19. The apparatus of claim 17, wherein the WUS gap size satisfies a warm-up threshold, and wherein the WUS gap size is greater than or equal to the minimum WUS gap capability.

20. The apparatus of claim 17, wherein the minimum slot offset satisfies a warm-up threshold and the WUS gap size comprises zero slots or one slot.

21. The apparatus of claim 17, wherein the minimum slot offset is based at least in part on a bandwidth part switch delay.

22. The apparatus of claim 17, wherein the minimum slot offset corresponds to a first bandwidth part (BWP), the first BWP comprising a default BWP.

23. The apparatus of claim 22, wherein the one or more processors are further configured to cause the apparatus to output for transmission an additional slot offset configuration corresponding to a second BWP.

24. The apparatus of claim 22, wherein the one or more processors are further configured to cause the apparatus to output for transmission a BWP adaptation configuration that indicates a second BWP associated with the PDSCH occasion, wherein the second BWP comprises a larger bandwidth than a bandwidth of the first BWP.

25. The apparatus of claim 17, wherein the one or more processors are further configured to cause the apparatus to obtain the minimum WUS gap capability associated with the UE.

26. The apparatus of claim 17, wherein the one or more processors are further configured to cause the apparatus to output for transmission a tracking reference signal (TRS), wherein the TRS is outputted at, or within a specified amount of time after, a start of an active period of a discontinuous reception cycle.

27. A method of wireless communication performed by a user equipment (UE), comprising:
receiving, from a network entity, a configuration of a minimum slot offset and a configuration of a wake-up signal (WUS),
wherein the configuration of the minimum slot offset is based at least in part on a minimum WUS gap capability associated with the UE, wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion scheduled by the PDCCH, and
wherein the configuration of the WUS is based at least in part on a WUS gap size, wherein the WUS gap size is based at least in part on the minimum slot offset and the minimum WUS gap capability; and
monitoring the PDCCH occasion based at least in part on the configuration of the minimum slot offset and the configuration of the WUS.

28. A method of wireless communication performed by a network entity, comprising:
transmitting a configuration of a minimum slot offset and a configuration of a wake-up signal (WUS),
wherein the configuration of the minimum slot offset is based at least in part on a minimum WUS gap capability associated with a user equipment (UE), wherein the minimum WUS gap capability corresponds to a capability of the UE to support a WUS gap having a minimum gap size, wherein the minimum slot offset indicates a minimum time period between a physical downlink control channel (PDCCH) occasion and a physical downlink shared channel (PDSCH) occasion, and
wherein the configuration of the WUS is based at least in part on a WUS gap size, wherein the WUS gap size is based at least in part on the minimum slot offset and the minimum WUS gap capability; and
transmitting data carried in the PDSCH occasion based at least in part on the configuration.

29. The apparatus of claim 1, further comprising a receiver configured to receive the configuration of the minimum slot offset and of the WUS, wherein the apparatus is configured as a user equipment (UE).

30. The apparatus of claim 17, further comprising a transmitter configured to transmit the configuration of the minimum slot offset and of the WUS, wherein the apparatus is configured as a network entity.

* * * * *